United States Patent [19]

Aruga

[11] Patent Number: 4,904,061
[45] Date of Patent: Feb. 27, 1990

[54] PROJECTION-TYPE LIQUID CRYSTAL DISPLAY DEVICE WITH EVEN COLOR

[75] Inventor: Shuji Aruga, Suwa, Japan

[73] Assignee: Seiko Epson Corporation, Tokyo, Japan

[21] Appl. No.: 338,521

[22] Filed: Apr. 14, 1989

Related U.S. Application Data

[63] Continuation of Ser. No. 233,297, Aug. 17, 1988, which is a continuation-in-part of Ser. No. 908,479, Sep. 17, 1986, abandoned, which is a continuation-in-part of Ser. No. 786,438, Oct. 11, 1985.

[30] Foreign Application Priority Data

| Oct. 22, 1984 | [JP] | Japan | 59-221556 |
| Jul. 31, 1985 | [JP] | Japan | 60-169442 |
| Nov. 26, 1985 | [JP] | Japan | 60-265289 |
| Aug. 18, 1987 | [JP] | Japan | 62-204768 |
| Aug. 28, 1988 | [JP] | Japan | 63-106072 |

[51] Int. Cl.$^4$ ............................................. G02F 1/13
[52] U.S. Cl. ........................... 350/339 F; 350/331 R; 350/345; 353/25; 353/31; 353/33; 353/34; 353/122
[58] Field of Search ............... 350/331 R, 339 F, 345, 350/338; 353/20, 23, 25, 33, 34, 37, 122

[56] References Cited

U.S. PATENT DOCUMENTS

| 973,961 | 10/1910 | Oliver | 353/33 |
| 1,662,693 | 3/1928 | Astafiev | 350/286 |
| 2,202,257 | 5/1940 | Klaver | 88/1 |
| 2,642,487 | 6/1953 | Schroeder | 350/173 |
| 2,737,076 | 3/1956 | Rock, Jr. | 88/1 |
| 2,747,460 | 5/1956 | Calvi | 353/33 |
| 2,754,718 | 7/1956 | Rock et al. | 88/1 |
| 2,958,258 | 11/1960 | Kelly | 353/20 |
| 2,971,051 | 12/1961 | Back | 178/5.4 |
| 3,220,306 | 11/1965 | Papke | 353/20 |
| 3,303,278 | 5/1964 | Beno et al. | 178/5.4 |
| 3,588,324 | 6/1970 | Marle | 178/5.4 |
| 3,594,497 | 7/1971 | Graser, Jr. | 353/20 X |
| 3,704,061 | 11/1972 | Travis | 350/171 |
| 3,767,290 | 10/1973 | Lang et al. | 350/173 |

(List continued on next page.)

FOREIGN PATENT DOCUMENTS

| 1096635 | 1/1961 | Fed. Rep. of Germany . |
| 1560501 | 2/1969 | France . |
| 48-79596 | 10/1973 | Japan . |
| 58-111193 | 6/1983 | Japan . |
| 58-111194 | 6/1983 | Japan . |
| 59-221556 | 10/1984 | Japan . |
| 5937166 | 9/1985 | Japan . |
| 475415 | 4/1937 | United Kingdom . |

OTHER PUBLICATIONS

"Matrix-Addressed Liquid Crystal Projection Display", P. J. Wild, SID 72 Digest, pp. 62, 63.

"Recent Advances in the Single-Gun Color Television Light-Valve System", William E. Good, SID 75 Digest.

"Optical Properties of a Liquid-Crystal Image Transducer at Normal Incidence: Mathematical Analysis and Application to the Off-State", G. Paul Montgomery, Jr., J.Opt.Soc.Am., vol. 70, No. 3, Mar. 1980, pp. 287-301.

"B/W and Color LC Video Displays Addressed by Poly Si TFTs", Shinji Morozumi et al., SID 83 Digest, pp. 156-157.

(List continued on next page.)

Primary Examiner—Stanley D. Miller
Assistant Examiner—Richard Gallivan
Attorney, Agent, or Firm—Blum Kaplan

[57] ABSTRACT

A projection-type display device for producing a faithful colored synthesized image based on equating the luminous intensity distributions and light patterns produced by three twisted nematic liquid crystal light valves for three primary color images. Each light valve includes a twisted nematic liquid crystal composition which is twisted to the right or left depending on the number of times that color light is reflected. Each light valve may include an active switching matrix arranged in mirror-like symmetry with light shield layers also arranged symmetrically.

28 Claims, 6 Drawing Sheets

U.S. PATENT DOCUMENTS

| | | | |
|---|---|---|---|
| 3,840,695 | 10/1974 | Fischer | 358/61 |
| 3,876,287 | 4/1975 | Sprokel | 350/347 E |
| 3,910,680 | 10/1975 | Kakeda | 350/347 E |
| 4,127,322 | 11/1978 | Jacobsen et al. | 353/31 |
| 4,191,456 | 3/1980 | Hong et al. | 353/31 |
| 4,425,028 | 1/1984 | Gagnon | 350/331 R |
| 4,448,491 | 5/1984 | Okubo | 350/344 |
| 4,461,542 | 7/1984 | Gagnon | 350/331 R |
| 4,464,018 | 8/1984 | Gagnon et al. | 350/331 R |
| 4,464,019 | 8/1984 | Gagnon | 350/331 R |
| 4,500,172 | 2/1985 | Gagnon et al. | 350/331 R |
| 4,500,172 | 2/1985 | Gagnon et al. | 350/331 R |
| 4,544,237 | 10/1985 | Gagnon | 350/331 R |
| 4,611,889 | 9/1986 | Buzak | 350/345 X |
| 4,650,286 | 3/1987 | Koda et al. | 350/331 R |
| 4,679,069 | 7/1987 | Andrea et al. | 353/37 X |
| 4,679,909 | 7/1987 | Hamada et al. | 350/333 |
| 4,687,301 | 8/1987 | Ledebuhr | 350/401 |
| 4,690,526 | 9/1987 | Ledebuhr | 353/31 |
| 4,715,684 | 12/1987 | Gagnon | 350/331 R |
| 4,749,259 | 6/1988 | Ledebuhr | 350/337 |
| 4,759,610 | 7/1988 | Yanagisawa | 350/334 |
| 4,783,146 | 11/1988 | Stephany et al. | 350/331 R |
| 4,826,311 | 5/1989 | Ledebuhr | 353/33 X |

OTHER PUBLICATIONS

"LCD Full-Color Video Projector", Shinji Morozumi, et al., SID 86 Digest, pp. 375–378.

"High-Resolution Full-Color Video Projector with Poly-SC TFT Array Light Valves", Shuji Aruga, et al., SID 87 Digest, pp. 75–78.

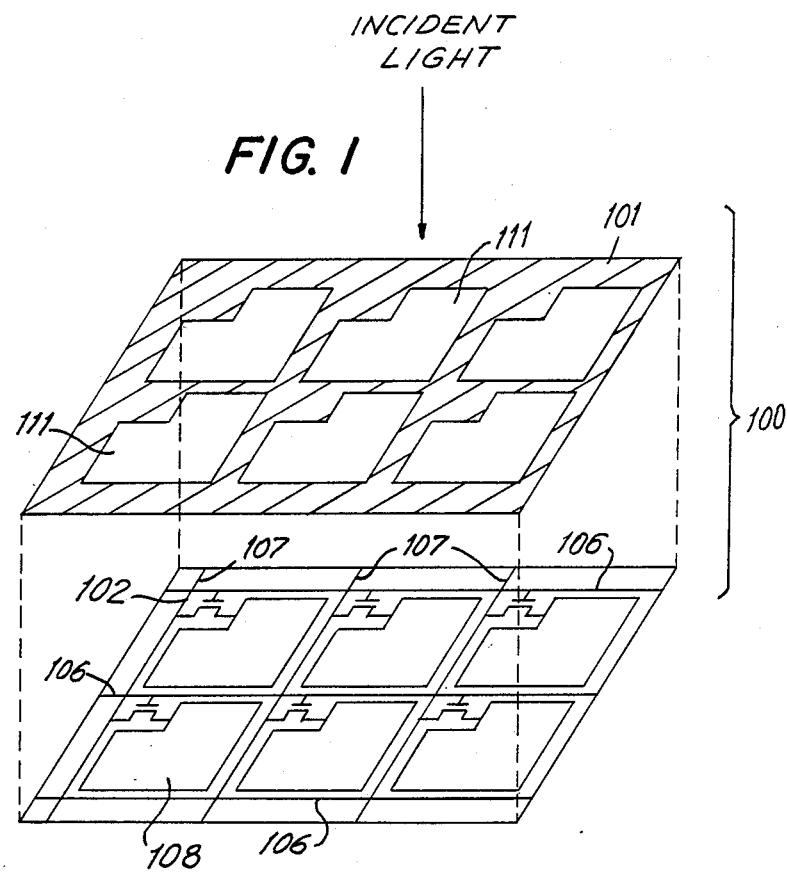
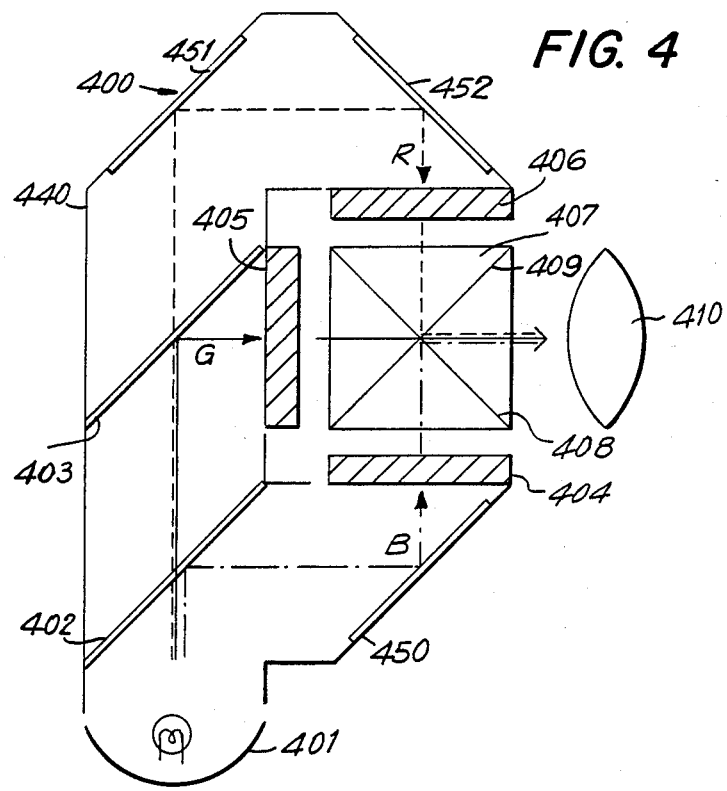

FIG. 5
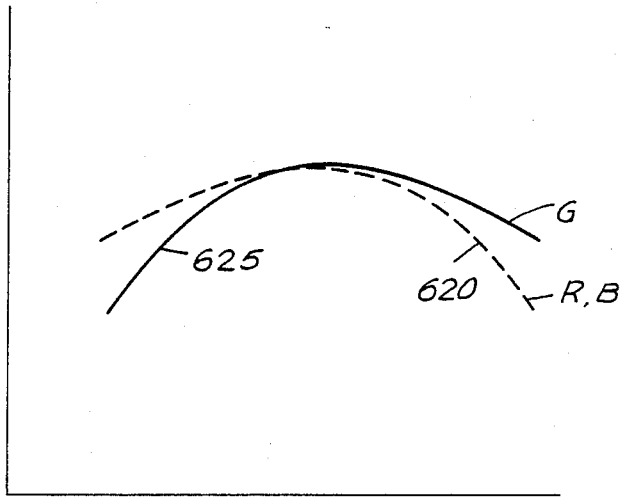
LIGHT VALVE POSITION PRIOR TO SYNTHESIZATION
VIEWING FROM LEFT TO RIGHT
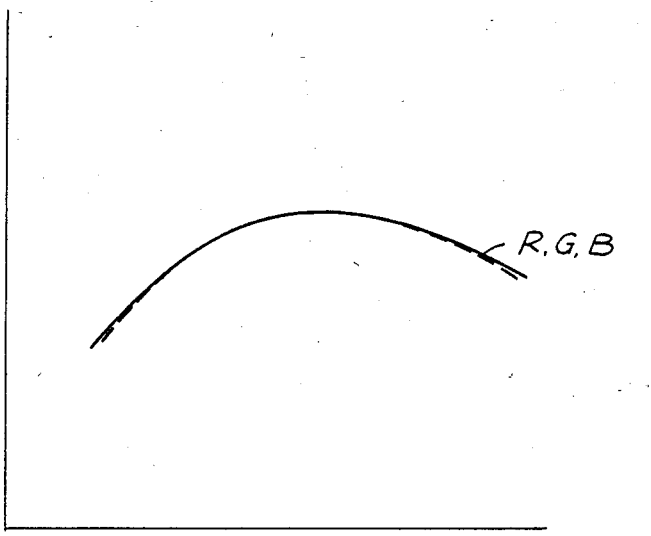
LIGHT VALVE POSITION AFTER SYNTHESIZATION
VIEWING FROM LEFT TO RIGHT
FIG. 6

PROJECTION-TYPE LIQUID CRYSTAL DISPLAY DEVICE WITH EVEN COLOR

BACKGROUND OF THE INVENTION

This is a continuation of application Ser. No. 233,297, filed Aug. 17, 1988 currently pending, which is a continuation-in-part of application Ser. No. 908,479 filed Sept. 17, 1986, now abandoned, which is a continuation-in-part of application Ser. No. 786,438 filed Oct. 11, 1985.

This invention relates generally to a projection-type display device, and more particularly to a colored projection-type display device using liquid crystal light valves.

Conventional projection-type display devices which use liquid crystal light valves having picture elements arranged in the form of a matrix such as those disclosed in Japanese Laid Open Application Nos. 179723/85 and 35481/86 separate the image to be displayed initially into its red, green and blue components. Each component is then directed toward a corresponding light valve which permits or prevents transmission of the light therethrough. The red, green and blue components of light are selectively permitted to pass through the light valves and form a red image, green image and blue image, respectively, which are then synthesized by additive color mixing using dichroic mirrors, a dichroic mirror prism or the like to create a synthesized image. A projection lens enlarges the synthesized image by projection onto a screen.

The optics of the dichroic mirror system are extremely simple. Consequently, color synthesis using a dichroic mirror system is suitable for a compact projection-type color display device.

Each light valve is based on a twisted nematic mode ("TN mode") of operation which is driven by an active switching array. The photoelectric transfer characteristics of a projection-type device using liquid crystal light valves in a TN mode of operation is dependent upon the angle at which the colored light enters the associated light valve (i.e. incident angle). More particularly, the luminous intensity distributions of the red image, green image and blue image are dependent upon the incident angles of red, green and blue components of light entering the associated light valves.

In producing the synthesized image, at least one of the red, green and blue images is reflected an even number of times and at least one of the red, green and blue images is reflected an odd number of times. Therefore, when the red, green and blue images are combined during synthesization, one of the three luminous intensity distributions is not the same as the other two luminous intensity distributions. Consequently, the synthesized image has portions which are more intensely colored and other portions which are less intensely colored than the original image. The uneven (i.e. irregular) coloring of the synthesized image results in a deterioration in the overall picture quality of the projected image.

The deteriorated level of color reproducibility can be avoided by providing that the red, green and blue wavelengths of light are completely collimated and enter the respective liquid crystal light valves at angles perpendicular to the surfaces of the light valves. Some components of the incident light entering each of the three liquid crystal light valves, however, inevitably will be other than at this perpendicular angle making it impossible to provide completely collimated light entering the light valves at angles perpendicular thereto. Diffused light entering a liquid crystal light valve further accentuates the irregular coloring of the synthesized image and produces further deterioration in the level of color reproducibility provided by conventional projection-type display devices.

Each liquid crystal light valve includes driving circuitry for driving a matrix array including switching elements. A corresponding light shielding layer has a repeating pattern of openings corresponding to the position of the switching elements. As light passes through each of the three liquid crystal light valves, the pattern of light produced (i.e. red image, green image or blue image) is representative of the repeating pattern of openings of the light shielding layer and/or the pattern of switching elements. Since one of the red, green or blue images is reflected either an even number of times while the other two images are reflected an odd number of times or is reflected an odd number of times while the other two images are reflected an even number of times, the red, green and blue images when combined together do not completely overlap within the synthesized image. Consequently, the picture produced on the screen of the projection-type display device has a further unevenness (i.e. roughness and irregularity) of color further reducing the level of color reproducibility.

Accordingly, it is desirable to provide a projection-type display using liquid crystal light valves which produces an image with excellent color reproducibility. The image projected should be without color irregularity and employ a dichroic mirror system.

SUMMARY OF THE INVENTION

Generally speaking, in accordance with the invention, a projection-type display device includes a colored light which is separated into its red, green and blue components, a light synthesis section and a projection lens portion. The three primary colors are each directed toward a different light valve which produces a corresponding primary color image. The red, green and blue images are transmitted directly or indirectly through one or more first reflectors towards an optical synthesizer which combines the red, green and blue images to form a synthesized image. Additional reflectors redirect the path of two of the three red, green and blue images to form the synthesized image. A projection lens projects the synthesized image towards a screen for viewing.

One of the three light valves produces a pattern of light having a mirror-like (i.e. bilateral) symmetric relation to the patterns of light produced by the other two light valves. The mirror-like symmetry is based, in part, on the number of reflections that each of the three patterns of light (i.e. red image, green image and blue image) must undergo to produce the synthesized image. More particularly, two of the three red, green and blue images are reflected either an even number or an odd number of times while the third of these three images is reflected either an odd number or an even number of times, respectively. It is the third of the three images which has the mirror-like symmetric pattern relative to the other two images. As used herein, an image which is not reflected by either the first reflectors or additional reflectors is considered to have been reflected an even number of times.

The symmetrical relationship between the red, green and blue images ensures that the corresponding luminous intensity distributions are likewise symmetrical. Therefore, after each of these three images have been reflected either an even or odd number of times and is then combined with the other two images by the optical synthesizer, the luminous intensity distributions overlap (coincide with) each other. An evenly colored synthesized image whose colors have been faithfully reproduced results.

The symmetrical relationship is also based on the bilateral symmetric relationship between the aligning layers, light shield layers and switching elements of the liquid crystal light valves. In one preferred embodiment, the light shield layer includes a plurality of openings forming a repeating pattern which is symmetric relative to its center axis in a vertical direction. The vertical axial symmetry of the light shield layer permits its use for all three liquid crystal light valves reducing its manufacturing cost.

Accordingly, it is an object of the invention to provide an improved projection-type display device using liquid crystal light valves which produce a synthesized image having even coloring which represents a faithful reproduction of the original image.

Another object of the invention is to provide an improved projection-type display device in which a bilateral symmetric relationship exists between the aligning layers, light shield layers and switching elements of the three liquid crystal light valves.

Still another object of the invention is to provide an improved projection-type display device in which the same light shield layer pattern can be used for all three liquid crystal light valves reducing the manufacturing cost for producing the light shield layers.

Still other objects and advantages of the invention will in part be obvious and will in part be apparent from the specification.

The invention accordingly comprises the several steps and the relation of one or more such steps with respect to each of the others and the apparatus embodying features of construction, a combination of elements and arrangement of parts which are adapted to reflect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded diagrammatic perspective view of elements of a twisted nematic liquid crystal light valve in accordance with the invention;

FIG. 4 is a diagrammatic top plan view of a projection-type display device arranged in accordance with one embodiment of the invention;

FIG. 5 is a graph of the luminous intensity distributions of the images produced by the three liquid crystal light valves versus distance in a horizontal direction along each light valve prior to synthesization;

FIG. 6 is a graph of the luminous intesity distributions of the images produced by the three liquid crystal light valves versus distance in a horizontal direction along each light valve after synthesization;

DETAILED DESCRIPTION OF THE PREFERRED EMBODIMENTS

Figure 2:
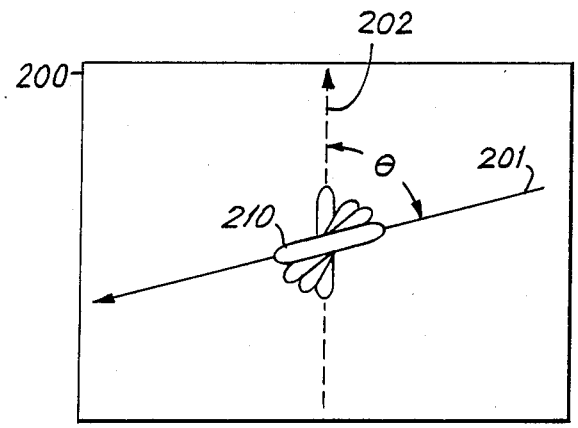
FIG. 2 is a diagrammatic plan view of a first light valve showing the angle of twist of the nematic liquid crystal.
Figure 3:
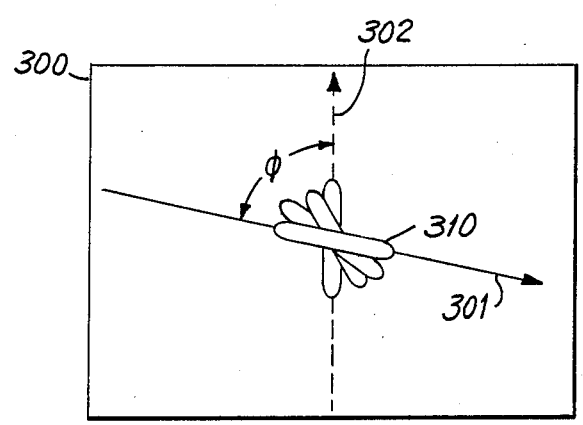
FIG. 3 is a diagrammatic plan view of a second angle of its twist of a nematic liquid crystal.

The first embodiment in accordance with the invention is shown in FIGS. 1 to 6. FIG. 1 illustrates a liquid crystal light valve for use in a projection device in accordance with the invention. FIGS. 2 and 3 show aligning distributions for the liquid crystal light valves. FIG. 4 shows a typical construction of the device and FIGS. 5 and 6 are luminous intensity distribution graphs.

Embodiment 1

An active matrix liquid crystal panel is used as the liquid crystal light valve. A plurality of thin film transistors (TFT) 102 are arranged in a matrix on a transparent substrate. A light shield layer 101 is arranged on the opposed substrate for shielding all areas of the active matrix other than the effective picture element area. Aligning layers are formed on each substrate which are rubbed and combined to form the light valve. When thin film transistors are used as switching elements for the picture elements, the TFT's may be formed on polysilicon, amorphous silicon and other semiconductor materials. Other switching elements, such as metal-insulator-metal (MIM) elements which function like a diode, ring diode elements, back-to-back diodes, or a simple multiplexing driving method are suitable for use in the light valves of the projection devices in accordance with the invention.

FIG. 1 illustrates elements of an active matrix array of a liquid crystal panel used as the liquid crystal light valve. A plurality of thin film transistors (TFT) 102 are formed on the interior surface of a lower substrate of a twisted nematic liquid crystal light valve and are coupled to an array of liquid crystal driving electrodes 108. A light shielding layer 101 having a plurality of openings 111 corresponding to driving electrodes 108 is formed on the upper transparent substrate (not shown) of the light valve.

Light shielding layer 101 shields TFT 102 and parallel scanning lines 106 and data lines 107 but not driving electrodes 108. The driving circuitry including TFT 102 and electrodes 108 turn light valve 100 on and off. Suitable materials for TFT 102 include polysilicon, amorphous silicon and compound semiconductor. The driving circuitry can also use elements with two terminals having diode characteristics, such as a ring diode and metal-insulator-metal (MIM) elements, back-to-back diodes or a simple multiplexing method.

Two types of liquid crystal light valves having symmetrical or mirror-image distributions are utilized. The symmetrical aligning distributions are provided by controlling the rubbing directions of the upper and lower substrates.

FIG. 2 shows the angle of twist direction and alignment of molecules 210 having a substrate 200 in a liquid crystal light valve having one substrate with an aligning direction 201 and an opposed substrate with an aligning direction 202. Aligning is accomplished by depositing an aligning layer on the substrate and rubbing in an orientation direction. A nematic liquid crystal molecules 210 are rotated an angle $\theta$ between aligning directions 201 and 202. An angle of twist $\phi$ and alignment of the other two liquid crystal light valves is shown in FIG. 3. One substrate has an aligning direction 301 on one substrate and an aligning direction 302 on the opposed substrate. The crossing angle of the aligning axes of the opposed substrates is 80° in both panels.

Where the panels are filled with nematic liquid crystal material one panel becomes a twisted nematic (TN) liquid crystal light valve which is twisted to the right and the other is a TN liquid crystal light valve twisted to the left. When nematic liquid crystal material includes an optical activator, the aligning distributions which are symmetrical are maintained more stably and permit twist angles of 90 degrees or greater to be employed. An optical activator which tends to rotate the crystals clockwise is used with a twisted nematic liquid crystal material twisted to the right. An optical activator which rotates counter-clockwise is used with a twisted nematic liquid crystal material 310 for twisting to the left.

FIG. 4 shows a projection-type display device 400 which includes a light source 401 which transmits light towards a dichroic mirror group, a light guide 440 and reflection mirrors. The dichroic mirror group includes a blue light reflection dichroic mirror 402 and a green light reflection dichroic mirror 403. The dichroic mirror group segregates the light from light source 401 into its primary colors. The mirror-like surface of blue light reflection dichroic mirror 402 and a first reflection mirror 450 bend and direct the blue light towards a blue twisted nematic liquid crystal light valve 404. The mirror-like surface of green light reflection dichroic mirror 403 bends and directs the green light towards a green twisted nematic liquid crystal light valve 405. Two reflection mirrors 451 and 452 bend and direct the red light towards a red twisted nematic liquid crystal light valve 406. Light valves 404, 405 and 406 are constructed and operate as the light valves described above.

Images formed by blue light passing through blue light liquid crystal valve 404 (blue image), green light passing through green light liquid crystal valve 405 (green image) and red light passing through red light liquid crystal valve 406 (red image) are synthesized using a dichroic mirror prism 407. Dichroic mirror prism 407 includes four rectangular dichroic prisms bonded to each other, and a red light reflection dichroic mirror surface 408 which crosses at a substantially right angle to a blue light reflection dichroic mirror surface 409. During color synthesis in dichroic mirror prism 407 red light and blue light are synthesized respectively by one reflection and green light is synthesized by transmission (with no reflection) and these light images are guided to a projection lens 410.

Red liquid crystal light valve 406 and blue liquid crystal light valve 404 include liquid crystal molecules twisted to the right as shown in FIG. 2. Green liquid crystal light valve 405 includes liquid crystal molecules having an aligning distribution twisted to the left as shown in FIG. 3. More particularly, the twist directions of liquid crystal light valves 404 and 406 are symmetrical and mirror-images of liquid crystal light valve 405. When the aligning distribution of red liquid crystal light valve 406 and blue liquid crystal light valve 404 are twisted to the left, the aligning distribution of green liquid crystal light valve 405 is twisted to the right. In this manner the object of symmetrical mirror-images in accordance with the invention is attained.

The luminous intensity distributions of the images produced by liquid crystal light valves 404, 405 and 406 prior to any light being reflected are shown in FIG. 5. The luminous intensities of the blue and red images produced by liquid crystal light valves 404 and 406, respectively, are substantially the same and are represented by a dashed line 620. The luminous intensity of the green image produced by green liquid crystal light valve 405 is represented by a solid line 625. The luminous intensities of these images are plotted versus the horizontal direction of each light valve as viewed from left to right. The blue, red and green images have substantially the same luminous intensities only about their centers (i.e. the luminous intensity distributions of the red image or blue image compared with the green image coincide only about the centers of each light valve).

As shown in FIG. 6, by reflecting the red image using red light reflection dichroic mirror surface 409 and the blue image using blue light reflection dichroic mirror surface 408 their corresponding luminous intensity distributions are changed (i.e. turned sideways). The luminous intensities of the red image, green image and blue image after synthesiztion are now substantially the same without uneven (i.e. irregular) coloring results. A faithful reproduction of the original color image is provided by projection-type color display device 400 constructed in accordance with the invention.

When the synthesized image is produced, the blue and red images are reflected the same number of times (i.e. once) whereas the green image is not reflected at all. The green image is in a mirror-like symmetric relation to the blue and red images. The reflections of the blue and red images avoid differences in the luminous intensity distributions between the blue and red images and the green image. Due to the symmetry between the blue and green and between red and green images, the luminous intensity distributions following synthesization completely overlap one another as shown in FIG. 6. Therefore, device 400 provides excellent color reproducibility of the original image.

Embodiment 2

Figure 7:
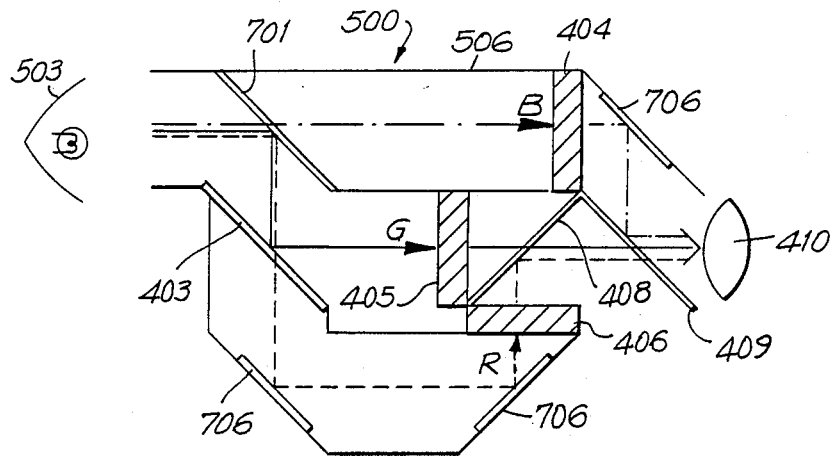
FIG. 7 is a diagrammatic top plan view of a projection-type display device constructed in accordance with an alternative embodiment of the invention.

A projection-type display device 500 constructed in accordance with a second embodiment of the invention is shown in FIG. 7 and includes liquid crystal light valves of the type used in Embodiment 1. Light transmitted by a light source 503 is directed toward a yellow light reflection dichroic mirror 701 which permits blue light to be transmitted therethrough with reflection of the remaining light towards a green light reflection dichroic mirror 403. The blue light passing through yellow light reflection dichroic mirror 701 enters blue liquid crystal light valve 404 which produces a blue image which is first reflected by one of a plurality of reflection mirrors 706 towards blue light reflection dichroic mirror surface 408.

Green light reflection dichroic mirror 403 reflects green light towards green liquid crystal light valve 405. The red light is transmitted through green light reflection dicrhoic mirror 403 and is reflected by two reflection mirrors 706 towards red liquid crystal light valve 406. The red image produced by liquid crystal light valve 406 is reflected by red light reflection dichroic mirror surface 409. The green image produced by green liquid crystal light valve 405 is not reflected at all.

The green image produced by green liquid crystal light valve 405 and the blue image produced by blue liquid crystal light valve 404 are each reflected an even number of times before a complete synthesized image is formed. Actually, the green image is reflected zero times and the blue image is reflected twice, that is, once by reflection mirror 706 and once by blue light reflection dichroic mirror surface 408. The red image produced by red liquid crystal light valve 406 is reflected an odd number of times, or once by red light reflection dichroic mirror surface 409.

Green liquid crystal light valve 405 and blue liquid crystal light valve 404 include twisted nematic liquid crystal molecules twisted to the right as shown in FIG. 2. On the other hand, red liquid crystal light valve 406 includes twisted nematic liquid crystal molecules twisted to the left as shown in FIG. 3 since the aligning directions 201 and 301 are in mirror-like symmetry. Consequently, the synthesized image which is projected by projection lens 410 has even (i.e. regular) coloring and faithful color reproduction.

Embodiment 3

Figure 8:
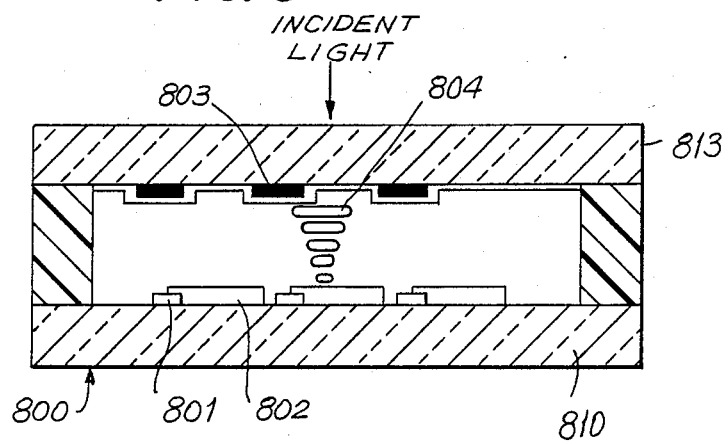
FIG. 8 is a diagrammatic cross-sectional view of a liquid crystal light valve of the type used in the projection-type display devices.
Figure 9:
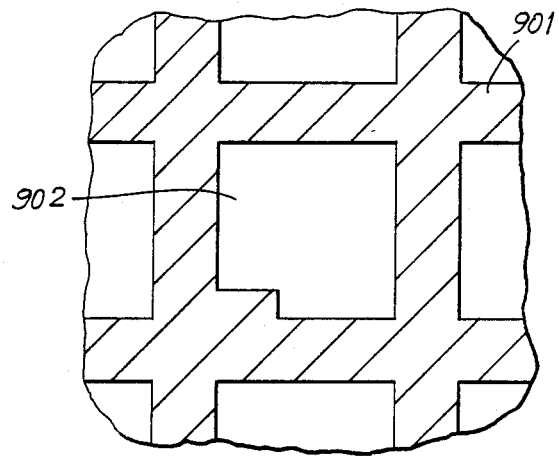
FIG. 9 is a plan view of a light shield layer used in at least one of the light valves in the projection-type display devices.
Figure 10:
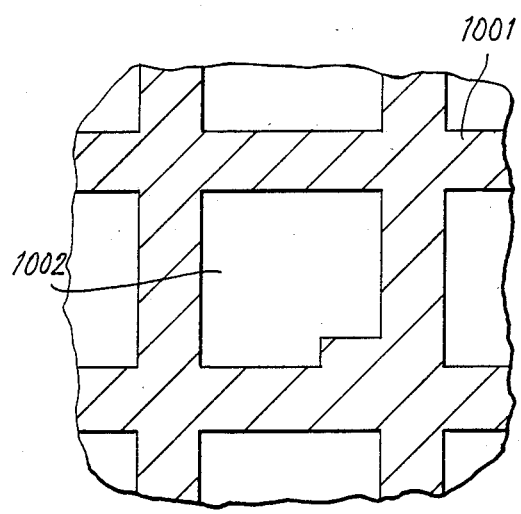
FIG. 10 is a plan view of a light shield layer which is a mirror-like symmetric image of the light shield layer of FIG. 9.
Figure 11:
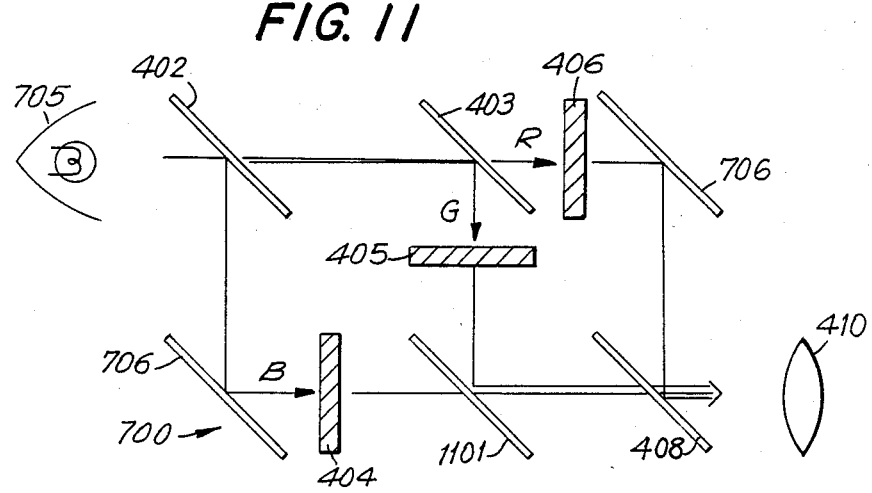
FIG. 11 is a diagrammatic top plan view of a projection-type display device arranged in accordance with another alternative embodiment of the invention.

FIG. 8 illustrates a cross-sectional view of a liquid crystal light valve 800 used in projection-type display devices in accordance with the invention as shown in FIGS. 4 and 11. FIGS. 9 and 10 show the repeating pattern of the light shield layer.

Valve 800 includes a plurality of active switching elements 801, such as polysilicon TFT or amorphous silicon TFT and a plurality of picture element electrodes 802 in the form of a matrix on a transparent substrate 810. Liquid crystal light valves 100, 404, 405 and 406 are constructed similar to crystal light valve 800. Active switching elements 801 and picture element electrodes 802 are used for controlling the photoelectric effect (i.e. turning "ON" and "OFF") of liquid crystal light valve 800.

A light shield layer 803, such as a coloring layer or metallic thin film, is formed as a grid on an opposed upper substrate 813 of liquid crystal light valve 800. The grid covers and thus prevents light from striking most of lower substrate 810 including active switching element 801, but does not cover picture element electrodes 802. After the desired aligning treatment is completed, substrates 810 and 813 are attached to one another with a liquid crystal composition 804 filled therebetween to form the light valve.

As shown in FIG. 9, a light shield layer 901 having a repeat pattern of openings 902 is used in one of the liquid crystal light valves to produce a light pattern which is a mirror-like symmetrical image of the light pattern produced by the other two light valves as shown in FIG. 10. A light shield layer 1001 has a repeat pattern of openings 1002 and is used with the remaining two liquid crystal light valves 800.

Light shield layers 901 and 1001 have repeating patterns of openings 902 and 1002, respectively, and are in a mirror-like symmetrical relationship. Active switching elements 801 in each light valve 800 are arranged in mirror image fashion with the repeating pattern of light shield layer 901 or the repeat pattern of light shield layer 1001 corresponding thereto.

In operation, incident light enters each liquid crystal light valve at lower substrate 810 and passes through light shield layer 803 and upper substrate 813. In projection-type display device 400 of FIG. 4 and projection-type display device 700 of FIG. 11 (discussed below), green liquid crystal light valve 405 includes light shield layer 901 with light passing through openings 902 prior to passing through upper substrate 813. In this same preferred embodiment, blue liquid crystal light valve 404 and red liquid crystal light valve 406 are constructed using light shield layer 1001 with light passing through openings 1002 of light shield layer 1001 prior to upper substrate 813.

Since the patterns of light shield layers used in liquid crystal light valves 404 and 406 of FIG. 4 are mirror-like images of the light shield layer pattern used in liquid crystal light valve 405, dichroic mirror prism 407 reflects (i.e. turns sideways) the red image and blue image and produces a synthesized image in which the patterns of light from the green image, blue image and red image are completely overlapped and coincide with each other. Thus, an even distribution of luminous intensities from each color results.

Referring now to FIG. 11, a projection-type display device 700 is shown. A light source 705 directed towards blue light reflection dichroic mirror 402 reflects blue light towards reflection mirror 706 which redirects the blue light towards blue liquid crystal light valve 404. Light passing through blue light reflection dichroic mirror 402 travels towards green light reflection dichroic mirror 403. The green light is reflected by green light reflection dichroic mirror 403 towards green liquid crystal light valve 405. The red light passing through green light reflection dichroic mirror 403 enters red liquid crystal light valve 406.

The blue image produced by blue liquid crystal light valve 404 passes through a green light reflection dichroic mirror surface 1101 and blue light reflection dichroic mirror surface 409 during synthesization. The green image produced by green liquid crystal light valve 405 is reflected by green light reflection dichroic mirror surface 1101 and is transmitted through red light dichroic mirror surface 409 similar to the blue image. The red image produced by red liquid crystal light valve 406 is first reflected by a second reflection mirror 706 and then by red light reflection dichroic mirror surface 409.

Both the blue and red images are reflected an even number of times. The blue image is not reflected and the red image is reflected twice (i.e. first by reflection mirror 766 and then by red light reflection dichroic mirror surface 409). The green image is reflected an odd number of times, that is, once by green light reflection dichroic mirror surface 1101. The completely synthesized image is directed towards projection lens 410.

The red and blue images are projected towards projection lens without positional transformation. The green image is a mirror-like image of the blue and red images and is reflected by green light reflection dichroic mirror surface 1101. The luminous intensity distribution of the green image is substantially the same as the red and blue images. Furthermore, since the same light shield layer pattern is used in liquid crystal light valves 404 and 406 which is a mirror-like image of the light shield layer used in light valve 405, the light patterns produced by light valves 404 and 406 have mirror-like symmetric patterns relative to the light pattern in liquid crystal light valve 405. Therefore, the light patterns of liquid crystal light valves 404, 405 and 406 completely overlap one another in the synthesized image.

Projection-type display device 700 produces a synthesized image having excellent (i.e. faithful) color reproducibility without irregular color in each of the picture elements. Furthermore, the optical constructions disclosed for projection-type display devices 400 and 700 are to be interpreted as merely illustrative and not in a limiting sense. The symmetric relationships between the light shield layers of liquid crystal light valves 404, 405 and 406 are based on the number of reflections each colored image will make in creating a completely synthesized image.

The rubbing directions of the substrates in liquid crystal light valve 405 twist the nematic liquid crystal composition to the right as shown in FIG. 2 and in crystal light valves 404 and 406 twist the nematic liquid crystal compositions to the left as shown in FIG. 3. Similar to projection-type display devices 400 and 500, projection-type display device 700 produces an image with both excellent color reproducibility and even coloring throughout the entire picture.

Embodiment 4

Figure 12:
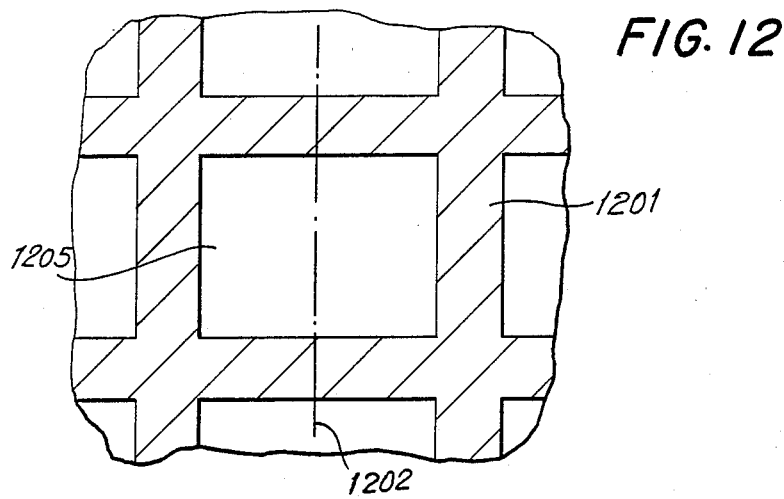
FIG. 12 is a plan view of the repeating pattern of a light shield layer utilized in the projection-type display devices arranged in accordance with the invention.

As shown in FIG. 12, a light shield layer 1201 having a repeat pattern of openings 1205 can be used as the light shield layer in liquid crystal light valve 800 of FIG. 8. Light shield layer 1201 is symmetrical about a vertical center axis 1202.

Liquid crystal light valves 404, 405 and 406 used in projection-type display devices 400 and 700 can be constructed using light shield layer 1201. The rubbing directions of the substrates for liquid crystal light valve 405 form a mirror-like symmetrical relation to the rubbing directions of the substrates for liquid crystal light valves 404 and 406. The twisted nematic liquid crystal composition of liquid crystal light valve 405 has a twist angle of approximately 80 degrees toward the left. The twisted nematic liquid crystal compositions of liquid crystal light valves 404 and 406 have twist angles of approximately 80 degrees toward the right.

Since the repeat pattern of light shield layer 1201 is symmetrical about axis 1202 with regard to the vertical center axis, the same light shield layer pattern can be used for all the light valves. The light shield layer repeat pattern is unaffected by the odd number of times that the pattern is reflected or by the even number of times that the pattern is reflected. What matters is only whether the total number of reflections is even or odd. As described above, the picture element patterns produced by each of the three liquid crystal light valves are completely overlapped in and thereby prevent irregular coloring of the synthesized image.

Since the same light shield layer repeat pattern can be used for each of the three liquid crystal light valves as shown in FIG. 12, the manufacturing process required for producing these light shield layers can be standardized. A photolithographic technique is generally employed in manufacturing the light shield layers. For example, for producing light shield layer 1201 only one photo-mask or the like is necessary. The production process is therefore simplified. The cost of producing the liquid crystal light valves is also reduced.

Figure 13A:
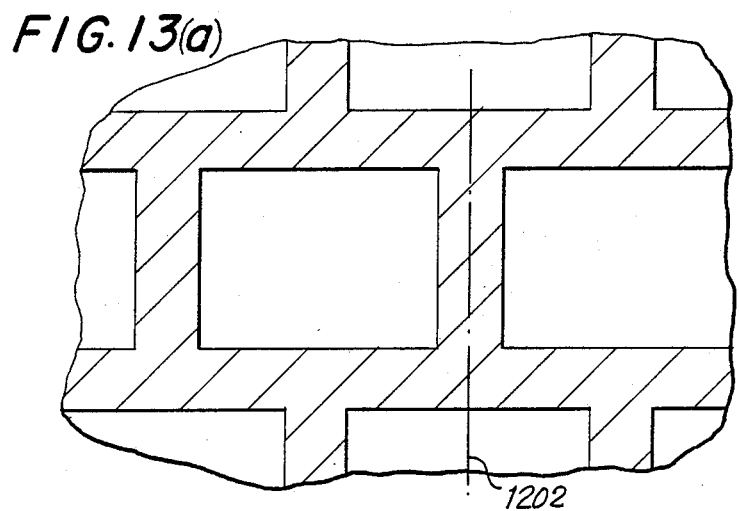
FIGS. 13(a) and 13(b) are plan views of alternative light shield layers.
Figure 13B:
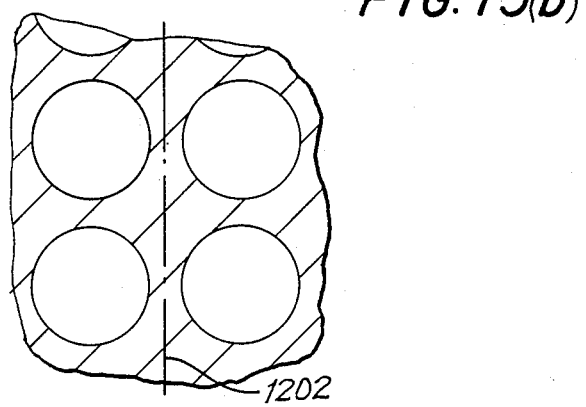

The repeat pattern of the light shield layer is not limited to the embodiments described herein. For example, any pattern providing axial symmetry relative to the vertical center axis of the light shield layer can be employed. Two such examples of axial symmetry are shown in FIGS. 13(a) and (b). Axial symmetry also can be attained by arranging the picture elements triangularly.

As now can be readily appreciated, projection-type display devices 400, 500 and 700 provide the same luminous intensity distributions for the three primary colors of the image. The overlapping luminous intensity distributions employing diffused light are achieved by providing a mirror-like symmetrical relationship between the image produced by one of the three liquid crystal light valves and the images produced by the other two liquid crystal light valves. The symmetry is achieved by the alignment distribution (i.e. rubbing direction of the substrates) and twist of the liquid crystal light valves and is based on the even or and odd number of reflections which the red, blue and green images undergo during synthesization.

The synthesized image is a faithful color reproduction with no irregular coloring. By providing that the repeating patterns of the light shield layers and the switching element arrangements of the three liquid crystal light valves are also in a mirror-like symmetrical relationship, the light patterns of the blue, red and green images overlap one another further avoiding irregular coloring. Devices 400, 500 and 700 provide excellent (i.e. faithful) color reproducibility of all picture elements within the image.

Dichroic mirror prisms are used to achieve the required odd number or even number reflections during color synthesis. Advantageously, dichroic mirror prisms employed within a projection-type display device permit manufacture of a relatively small sized device.

Still further, light shield layers employing axial symmetry along the vertical center axis of the light shield layer permit a simple manufacturing process to be employed in their production resulting in a lower manufacturing cost of the liquid crystal light valves.

It will thus be seen that the objects set forth above, and those made apparent from the preceeding description, are efficiently obtained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A projection-type display device comprising:
   a light source for generating light;
   color separating means for separating the light into at least its primary colors;

liquid crystal light valve means for producing colored images based on the colored light;

optical synthesizing means for combining the colored images to form a synthesized image; and projection lens means for projecting the synthesized image toward an object for viewing of the image;

said optical synthesizing means including reflection means for reflecting at least one of the colored images and directing the synthesized image toward the projection lens means;

wherein the liquid crystal light valve means includes three light valves filled with liquid crystal material, the liquid crystal material of one light valve being twisted in a direction opposite to the directions in which the liquid crystal materials of the other two light valves are twisted.

2. The projection-type display device of claim 1, wherein each of the light valves has a pair of substrates, two of these pairs of substrates being rubbed in directions which are mirror-like symmetric to the rubbing directions of the third pair of substrates.

3. The projection-type display device of claim 2, wherein each liquid crystal light valve includes a light shield layer for shielding portions of the light valve from light passing through the light valve in the form of a repeated pattern of openings.

4. The projection-type display device of claim 3, wherein each repeated pattern of openings is symmetric about its center axis in a vertical direction.

5. The projection-type display device of claim 1, wherein each liquid crystal light valve includes a plurality of switching elements disposed therein for controlling the photoelectric characteristics of that light valve.

6. The projection-type display device of claim 5, wherein the switching elements of one light valve has a mirror-like symmetrical arrangement relative to the arrangement of the switching elements disposed within the other two light valves.

7. The projection-type display device of claim 1, wherein the color separating means includes dichroic mirror means for reflecting a predetermined wavelength of light and transmitting all other wavelengths of light.

8. The projection-type display device of claim 1, wherein the optical synthesizing means includes a dichroic mirror prism group.

9. The projection-type display device of claim 8, wherein the reflecting means of the optical synthesizing means includes a pair of reflective dichroic mirrors.

10. The projection-type display device of claim 9, wherein the pair of reflective dichroic mirrors lie in substantially parallel planes.

11. The projection-type display device of claim 9, wherein the pair of reflective dichroic mirrors lie in substantially perpendicular planes.

12. The projection-type display device of claim 1, further including additional reflection means for reflecting said at least one of the colored images prior to its reflection by the reflection means of the optical synthesizing means.

13. The projection-type display device of claim 1, wherein each liquid crystal light valve includes a light shield layer for shielding portions of the light valve from light passing through the light valve in the form of a repeated pattern of openings.

14. The projection-type display device of claim 13, wherein each repeated pattern of openings is symmetric about its center axis in a vertical direction.

15. The projection-type display device of claim 14, wherein each liquid crystal light valve includes a plurality of switching elements disposed therein for controlling the photoelectric characteristics of that light valve.

16. The projection-type display device of claim 15, wherein the switching elements of one light valve have a mirror-like symmetrical arrangement relative to the arrangement of the switching elements disposed within the other two light valves.

17. The projection-type display device of claim 16, further including additional reflection means for reflecting said at least one of the colored images prior to its reflection by the reflection means of the optical synthesizing means.

18. A projection-type display device comprising:
a light source for generating light;
color separating means for separating the light into at least its primary colors and including dichroic mirror means for reflecting a predetermined wavelength of light and transmitting all other wavelengths of light;
liquid crystal light valve means associated with each colored light for producing colored images and including three light valves wherein each of the light valves has a pair of substrates, two of these pairs of substrates being rubbed in directions which are mirror-like symmetric to the rubbing directions of the third pair of substrates, each of the light valves also having a light shield layer for shielding portions of the light valve from light passing through the light valve in the form of a repeated pattern of openings which are symmetric about their respective center axes in a vertical direction;
optical synthesizing means for combining the colored images to form a synthesized image; and
projection lens means for projecting the synthesized image toward an object for viewing of the image;
said optical synthesizing means including reflection means having at least one reflective dichroic mirror for reflecting at least one of the color images and directing the color images to the lens means;
wherein the three light valves are filled with liquid crystal material, the liquid crystal material of one light valve being twisted in a direction opposite to the direction in which the liquid crystal materials of the other two light valves are twisted and wherein each liquid crystal light valve includes a plurality of switching elements disposed therein for controlling the photoelectric characteristics of that valve, the switching elements of said one light valve having a mirror-like symmetrical arrangement relative to the arrangement of the switching elements disposed within said other two light valves.

19. A method of producing substantially the same luminous intensity distribution for each of three different liquid crystal light valves within a projection-type display device comprising:
segregating light into its primary colors;
directing the colored light towards the three liquid crystal light valves for producing corresponding color images;
reflecting at least one of the primary color images towards an optical synthesizer;
reflecting said at least one of the primary color images again; and
symmetrizing the primary color images based on which of the primary color images is to be reflected an odd number of times and which of the primary color images is to be reflected an even number of times to make the luminous intensity distributions of the color images substantially equal.

20. The method of claim 19, wherein the primary images are symmetrized by providing a light shield layer for each light valve in which one of the light shield layers has a mirror-like symmetric pattern of openings relative to the pattern of openings of the other two light shield layers.

21. The method of claim 19, wherein the primary color images are symmetrized by utilizing two light valves with a liquid crystal material having a twist in a first direction and the remaining light valve with a liquid crystal material having a twist in the opposite direction, the color images produced by said two light valves reflected an even or odd number of times and the color images produced by said remaining light valve being reflected an odd or even number of times, respectively.

22. The method of claim 21, wherein each liquid crystal light valve includes an active switching matrix array with the active switching matrix of said remaining light valve in mirror-like arrangement relative to the arrangements of the active switching matrixes in said two light valves.

23. A method of producing substantially the same luminous intensity distribution for each of three different liquid crystal light valves within a projection-type display device, comprising:
segregating light into its primary colors;
directing the colored light towards the three liquid crystal light valves for producing corresponding color images;
reflecting at least one of the primary color images towards an optical synthesizer;
reflecting said at least one of the primary color images again; and
symmetrizing the primary color images based on which of the primary color images is to be reflected an odd number of times and which of the primary color images is to be reflected an even number of times to make the luminous intensity distributions of the color images substantially equal, the primary color images being symmetrized by providing a light shield layer for each light valve in which one of the light shield layers has a mirror-like symmetric pattern of openings relative to the pattern of openings of the other two light shield layers by providing two light valves with a liquid crystal material having a twist in a first direction and the remaining light valve with a liquid crystal material having a twist in the opposite direction, the color images produced by said two light valves reflected an even or odd number of times and the color image produced by said remaining light valve being reflected an odd or even number of times, respectively, and by providing that each liquid crystal light valve includes an active switching matrix array with the active switching matrix of said remaining light valve in mirror-like arrangement relative to the arrangements of the active switching matrixes in said two light valves.

24. A method of producing substantially the same luminous intensity distribution for each of three different liquid crystal light valves within a projection-type display device comprising:
segregating light into its primary colors;
directing the colored light towards the three liquid crystal light valves for producing corresponding colored images;
reflecting at least one of the primary colored images an odd number of times; and
symmetrizing the primary colored images based on which of the primary colored images is to be reflected an odd number of times and which of the primary colored images is to be transmitted through said optical synthesizer to make to luminous intensity distributions of the colored images substantially equal.

25. The method of claim 24, wherein symmetrizing of the primary colored images is also based on which of the primary colored images is to be reflected an even number of times.

26. A projection-type display device comprising:
means for producing colored lights;
liquid crystal light valve means associated with each colored light for producing colored images;
optical synthesizing means for combining the colored images to form a synthesized image; and
projection lens means for projecting the synthesized image toward an object for viewing of the image;
said optical synthesizing means including reflection means for reflecting at least one of the colored images and directing the synthesized image toward the projection lens means;
wherein the liquid crystal light valve means includes more than one light valve each of which has a light shield layer for shielding portions of the light valve from light passing through the light valve and includes a repeated pattern of openings, the repeated pattern of openings of one of said light shield layers being mirror-like symmetric to the pattern of openings of each of the other light shield layers.

27. The projection-type display device of claim 26, wherein each repeated pattern of openings is symmetric about its center in a vertical direction.

28. A projection-type display device comprising:
means for producing colored lights;
liquid crystal light valve means associated with each colored light for producing colored images;
optical synthesizing means for combining the colored images to form a synthesized image; and
projection lens means for projecting the synthesized image toward an object for viewing of the image;
said optical synthesizing means including reflection means for reflecting at least one of the colored images and directing the synthesized image toward the projection lens means;
wherein the liquid crystal light valve means includes more than one light valve each of which has a plurality of switching elements for controlling the photoelectric characteristics of the light valve, the switching elements of one light valve having a mirror-like symmetrical arrangement relative to the arrangement of switching elements of each of the other light valves.

* * * * *